FERRITE COATING

Filed Jan. 9, 1961

MICHEL B. VILENSKY
INVENTOR.

BY Nathan N. Kallman

ATTORNEY 3,188,400
Patented June 8, 1965

3,188,400

FERRITE COATING

Michel B. Vilensky, San Francisco, Calif., assignor to Ampex Corporation, Redwood City, Calif., a corporation of California Filed Jan. 9, 1961, Ser. No. 81,479
5 Claims. (Cl. 179—100.2)

This invention relates to ceramic seals and joinders, and particularly to methods and structures for providing a spacer element between the pole tips of a ferrite magnetic head assembly.

While many different techniques are now known and used for joining ceramics to metals, and for providing ceramic to metal seals, fully satisfactory ceramic to ceramic seals and joinders have not heretofore been provided for many applications. Difficulties have been encountered, because an applied ceramic may have an adverse effect upon the operative properties of the base material to which it is applied.

A useful illustration of the foregoing situation is found in the art of magnetic recording wherein ceramic magnetic materials are often used in transducer assemblies for the recording and reproduction of signals. Magnetic head assemblies employ a high reluctance, or substantially nonmagnetic, gap or spacer element in the vicinity of a magnetic record surface. In recording, a magnetic field is established between the pole tips on either side of the nonmagnetic spacer element. The presence of the spacer element causes a fringing flux to pass through the adjacent magnetic record surface to leave a remanent magnetization pattern which is an accurate representation of the electrical signals being recorded. To reproduce these signals, the head assembly is moved relative to the record medium, with the pole tips and the spacer element passing in contact with, or very close to, the remanent magnetization fields that exit at the record surface. A changing magnetic field is thus established in the magnetic head assembly to induce currents in a coil and thereby generate signals that are representative of the initially recorded signals.

The above-described general type of construction for magnetic head assemblies is well known. It is also understood by those skilled in the art that the spacer element must be precisely defined, but physically stable. To this end, the magnetic head structure may be fabricated in two halves, and the pole tip elements that are to be on the opposite sides of the gap may then be separately shaped and machined. For final assembly of the two halves, suitable nonmagnetic gap forming elements, such as conductive metal or glass, are inserted between or applied to the exposed pole tips. The problems involved in obtaining suitable mechanical and magnetic properties in the final structure are, however, generally recognized to be appreciable. This is particularly true with respect to the magnetic ceramic materials, such as the various types of ferrites that are used in magnetic head designs.

Ferrite assemblies have especially good properties for a number of recording and reproducing applications. They operate sensitively over extremely wide frequency bands and at frequencies well into the megacycle per second region. For some applications, it is found to be preferable to fabricate the heads from a single ferrite crystals. Ferrite is a brittle material, however, particularly in single crystal form, and is often broken or chipped during fabrication or use.

The spacing between the pole tips of a head assembly may necessarily be extremely small, of the order of $\frac{1}{10000}''$ or less, for high resolution and high frequency capabilities. It will readily be understood that with such a spacing between the opposed pole tips it becomes very difficult to provide a spacer element, which can satisfy simultaneously the critical demands as to mechanical and magnetic properties that are placed upon it. The spacer should preferably provide a strong physical bond between the pole tips, or at least firmly adhere to each of the individual pole tips without irregularities or porosity, inasmuch as such defects adversely affect magnetic properties. The expansion coefficient of the gap spacer element should be close to that of the ferrite, inasmuch as wide differences cause internal stresses to be generated, which might result in chipping or cracking at the pole tips. Furthermore, the materials that form or define the gap must not chemically affect the ferrite in any way to alter the magnetic properties or the mechanical properties including the hardness and density, or the ferrite. With a vitreous spacer coated directly onto the ferrite, the melting point of the spacer material must be less than that of the ferrite.

Heretofore, spacer elements have been chosen for their nonmagnetic properties. Consistent with such approach, it has been thought that certain frequency and response limitations are inherently imposed by the dimensions of the gap between the pole tips. A very small gap has superior high frequency capabilities, for example, but also encompasses fewer flux lines at any instant in time. For this reason, gap size, in conventional head design, has been considered to limit output voltage to determinable magnitudes. A new form of construction, which overcomes these theoretical limitations, would obviously have wide utility and marked advantages.

It is therefore an object of the present invention to provide an improved ceramic to ceramic seal and joinder.

Another object of the present invention is to provide an improved method for sealing and joining a ceramic material.

A further object of the present invention is to provide a superior magnetic head assembly.

Yet another object of the present invention is to provide an improved method for fabricating a spacer element for a magnetic head assembly using a ferrite material.

Yet another object of the present invention is to provide an improved magnetic head assembly, having a firm and adherent spacer element between ferrite pole tips.

Another object of the present invention is to provide a magnetic head assembly having improved frequency and resolution characteristics.

Still another object of the present invention is to provide an improved method for coating a ferrite element with glass material in a manner that provides a physically stable structure having high strength and a minimum of irregularities.

A further object of the present invention is to provide improved structures and methods for fabricating magnetic head assemblies.

In methods and structures in accordance with the present invention, a ceramic seal or bond is provided for ceramic base materials by a composition that is so affixed that a microstructural transition layer is formed between the composition and the base ceramic. In a ferrite magnetic head assembly, for example, a precisely dimensioned and stable spacer element comprising a fluxing glass compound that includes ferrite particles in suspension is applied to each of the ferrite pole tips. A special compound including glass therein is utilized that is formed from a fluxing material, a wetting material, and a powdered ferrite. Each of the ingredients is prepared separately, and each of the ingredients is then pulverized to a degree of fineness in which each passes a selected, fine mesh. The ingredients are then mixed in a selected proportion, placed in suspension and the suspension is coated on the pole tips. After drying, the coating is fired at a temperature sufficient to vitrify the material. The resultant coating is firmly and mechanically united to the pole tips with a bond, free from porosities and other irregularities. The structure is such that at the firing temperature an interatomic exchange exists between the coating and the ferrite, resulting in the microstructural transition layer, which assures that both physical and magnetic properties will be as desired.

An important feature of magnetic head assemblies thus provided is a significant improvement in magnetic properties. The presence of pulverized ferrite in the spacer element somewhat reduces the reluctance of the spacer element. Instead of having an adverse effect upon operative capabilities, however, the change in permeability resulting is found to enhance signal strength and resolution characteristics.

A better understanding of the invention may be had by reference to the following description, taken in combination with the accompanying drawing, in which.

Figure 1:
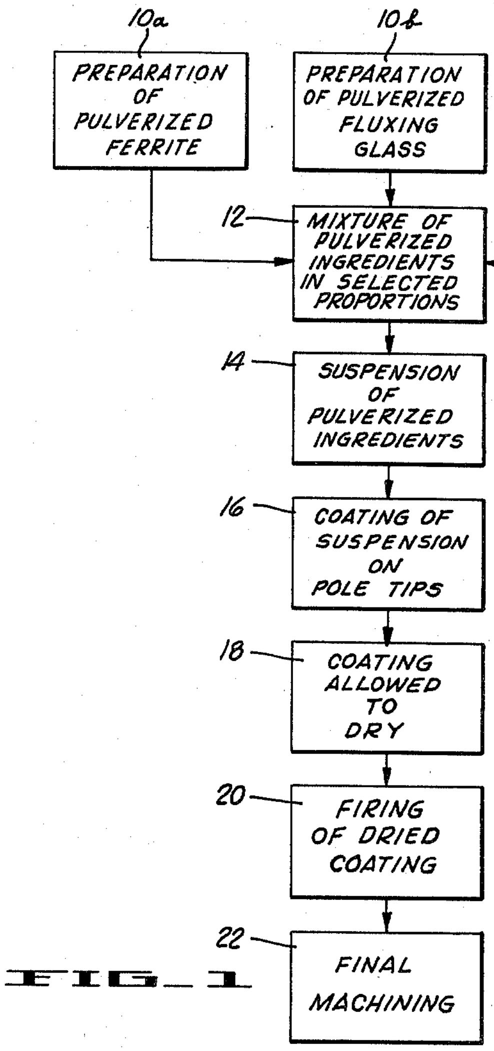
FIG. 1 is a block diagram representation of a process for providing a ceramic to ceramic seal in accordance with the invention.

A practical example of a ceramic to ceramic seal and of a method in accordance with the present invention is provided by FIG. 1, which shows the steps that are employed in disposing a spacer element so as to join the pole tips of a ferrite magnetic head. As shown in FIG. 1, different ingredients are separately prepared for this purpose. It is known initially that the base ceramic material, here a magnetic ferrite ceramic, has a particular composition. In accordance with the invention, one of the initial steps is the preparation of a finely pulverized ferrite of like, or substantially like, composition to that of the base material. This is shown by step 10*a* in FIG. 1. Preferably, the pulverized ferrite is made sufficiently fine to pass a 325 mesh.

A fluxing inorganic complex is separately prepared, as shown in step 10*b* of FIG. 1. The primary requirements for this material are that it should be a suitable vitreous fluxing agent, and that it have a melting point below that of the ferrite which is to serve as the base structure. In a preferred example, the following molecular composition is employed:

| | |
|---|---|
| $CaO$ | 0.20 |
| $K_2O$ | 0.10 |
| $Na_2O$ | 0.20 |
| $Li_2O_3$ | 0.50 |
| $Al_2O_3$ | 0.11 |
| $B_2O_3$ | 0.04 |
| $SiO_2$ | 1.45 |

A glass of this composition has a melting temperature between 1190° C. and 1225° C. The glass of this composition is obtained by melting corresponding oxide forming materials, such as carbonates, sulfates, and the like. The resulting product is pulverized and ball milled to a fineness corresponding to that of the ferrite. That is, the pulverized powder is reduced to a size at which it will pass a 325 mesh or smaller.

A third ingredient is also prepared, as shown in step 10*c* of FIGURE 1, this being an inorganic complex in the form of a glass having superior fluidity and wetting properties. These requirements are satisfied by lead type glasses having lead oxide contents not exceeding 60%. A preferred chemical composition for such a glass is as follows:

| | Percent |
|---|---|
| $PbO$ | 50.0 |
| $Fe_2O_3$ | 20.0 |
| $SiO_2$ | 10.0 |
| $ZnO$ | 5.0 |
| $B_2O_3$ | 15.0 |

As with the glass previously discussed, this glass may be prepared by the melting of oxide forming materials, followed by the pulverization of the resultant product to a fineness at which the particles pass a 325 mesh.

In the next step represented by a block 12 in FIG. 1, in accordance with the invention, each of the three prepared materials is thoroughly mixed with the others. As a practical example, it is preferred to use a mixture of the above ingredients in which the fluxing complex is approximately 35%, the wetting complex is approximately 40%, and the pulverized ferrite is approximately 25% by weight. It should be borne in mind that the mixing should be very thorough and for this purpose it is preferred to employ an agate or similar type mortar.

After the components are thoroughly mixed together, they may be suspended in a solution (step 14 in FIG. 1) so that they may be applied to the base ceramic. A preferred suspension is maintained in a solution of nitrocellulose prepared by dissolving dry nitrocellulose in diethyl carbonate and diethyl oxalate, in a proportion of 2.5 grams of dry nirtocellulose to 125 cc. of diethyl carbonate and 40 cc. of diethyl oxalate.

A suspension thus prepared may then be coated (step 16 in FIG. 1) onto the pole tips, which define the base ceramic for which a seal is desired. The coating may be applied with a brush or sprayed onto the base ceramic.

The coating then, step 18 in FIG. 1, is permitted to dry on the pole tips at room temperature. A selected thickness of coating may be built up on each pole piece, in order to control the dimensions of the resulting spacer.

Thereafter, as shown in step 20 in FIG. 1, the dried coating may be vitrified by firing at an elevated temperature in excess of the melting temperature of the glass constituents but below the temperature of the ferrite. Here, a temperature of 1000° C. to 1250° C., depending upon the type of ferrite to be coated, is maintained for a period of 10 to 15 minutes. To provide a unitary structure, the opposing pole tips may be held in parallel relation with the coatings in contact so that a single vitreous body results from the firing, and the pole pieces may be machined to final form. Where the pole pieces are not joined together by the spacer element during firing, a machining operation 22 may be used to control the thickness and plane of direction of the spacer element. Thus, on placing together the two halves of a pole piece assembly, the two facing surfaces which form the complete spacer element lie flush against each other, and the spacer element is coextensive with, but does not protrude beyond, the pole tips. Alternative methods of joining the pole tips with a precise spacing will readily suggest themselves to those skilled in the art.

A spacer element as thus provided for magnetic recording heads has a considerable number of material advantages over similar spacer elements heretofore available. It is physically stable, even though as ultimately machined it may be extremely thin (of the other of a few ten-thousandths of an inch or less). The thermal coefficient of expansion of the vitreous coating is substantially like that of the ferrite, so that few problems are presented by internally engendered stresses due to thermal expansion. The spacer element is also harder than the ferrite, so that the operative parts of a ferrite head are not unduly worn by contact with a record medium.

Figure 3:
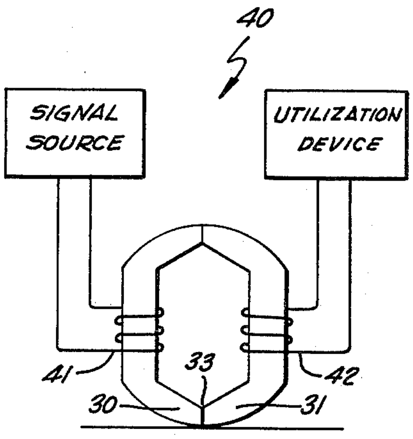
FIG. 3 is a side view of a magnetic head assembly.
Figure 2:
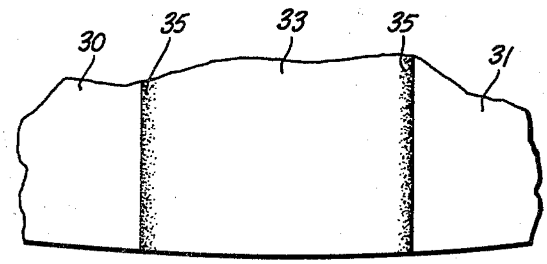
FIG. 2 is an enlarged sectional view of a ceramic seal as employed in a magnetic head assembly provided in accordance with the present invention.

Further significant advantages derived from this type of ceramic structure may be appreciated by reference to the greatly magnified and somewhat simplified representation of FIG. 2. As shown in FIG. 2, the unitary structure is formed of a pair of ferrite pole tips 30, 31 with an intermediate spacer element 33. The drawing is not to scale, so that the relative sizes of the parts and layers shown are not to be considered as representative of actual dimensions. A magnetic head assembly 40 is shown in FIG. 3, this assembly 40 including coils 41, 42 coupled to an external signal source 43 and utilization device 44 and being disposed adjacent a record medium 45.

A microstructural transition layer 35 (shown shaded in FIGURE 2) is formed between the spacer 33 and each of the pole tips 30, 31. This transition layer 35 extends for only a relatively few microns in depth, but is uniform along the joining surfaces. The transition layer results from interatomic exchange between the ferrite and the coating at the elevated temperatures used in firing. It appears that the presence of finely divided ferrite in suspension considerably assists the formation of such layer.

The presence of the microstructural transition layer assures a good physical bond between the two ceramics. Furthermore, the structure is free from occluded gases, cracks, and other irregularities. In effect, a solid solution is formed with the ferrite at the transition layers. The entire structure is physically stable, has enhanced strength, and does not adversely affect the magnetic properties of the ferrite itself. Viewed in a slightly different sense, the ferrite becomes impregnated with glass throughout the entire microstructural transition layer, thereby providing a fine grain composition which has no pores or cracks but has instead a substantially homogeneous composition. For these reasons, the structure which is presented in contact with the magnetic tape is uniform but has high hardness, and therefore is not subject to wear which is otherwise encountered.

The increased strength and freedom from irregularities which are thus provided are particularly useful in ferrite head assemblies which employ single crystal ferrites.

It will also be recognized by those skilled in the art that ceramic seals in accordance with the invention may be used wherever it is desired to decrease the porosity of a ceramic or to increase its physical strength. Coatings applied in this manner provide a hermetic seal for the ferrite, thus preventing the escape of moisture and occluded gases.

Heretofore, magnetic head assemblies have utilized a low permeability gap, such as is provided by air or a nonmagnetic spacer element. The critical factor is not the gap itself, of course, but the strength and concentration of the magnetic field which penetrates the record medium. Here it is found that the variable permeability introduced by the limited amount of ferrite on the spacer element can be of material benefit in recording. The fringing field still exists, but is confined to the gap region. The configuration of the field is such, however, that virtually the same useful flux still exists.

The benefits of magnetic head assemblies in accordance with the invention are also realized in signal reproduction. Workers in the art have previously used the formula:

$$\text{Gap loss (in db)} = 20 \log \frac{\sin (\pi l/\lambda)}{\pi l/\lambda}$$

where: $l$=the effective gap length
$\lambda$=the wavelength of the recorded signal This equation defines the recognized 6-db-peroctave increase in response of a magnetic head with frequency. Note that the "effective" gap length is usually greater than the theoretical with prior art heads. In heads according to the present invention, however, several advantages are concurrently obtained. The premeability of the ferrite actually decreases the effective gap length, thus lowering losses and bettering high frequency response. The firm bond and physical integrity of the spacer element permit a uniform and precisely dimensioned product to be fabricated and finished more readily. And the hardness of the spacer element, relative to the ferrite, means that the effective gap length does not decrease significantly with wear.

The advantages derived may also be viewed from the aspect of the flux line distribution at the gap. Previously, with a very small gap, relatively few flux lines would be intercepted at any instant in time and only a low voltage would be produced. The presence of ferrite in the spacer element, however, effectively redistributes and concentrates the flux at the gap. More flux lines are thus intercepted at any instant and a higher output signal is produced.

Thus there have been described improved ceramic to ceramic seals, and methods of providing such seals, which provide a microstructural transition layer between the two ceramics. Spacer elements having excellent bonding and physical characteristics may be provided for magnetic head assemblies utilizing magnetic ceramic materials. The operative characteristics of magnetic head assemblies may be materially enhanced by utilizing spacer elements containing a proportion of pulverized ferrite in suspension.

What is claimed is:

1. A structure providing a physically stable spacer element between ferrite parts which includes a fired glass material containing ferrite particles corresponding to the ferrite parts and which defines microstructural transition layers at the joinder between the ferrite and spacer element, the transition layers being in the form of ferrite solid solutions.

2. A ceramic material for sealing together ferrite elements, including a fused body containing approximately 35% of a soda-lime type glass, approximately 40% of a lead type glass, with the remainder being a ferrite corresponding to the ferrite elements to be joined.

3. A magnetic head assembly including a pair of ferrite pole elements, and a vitreous spacer element joining the pole elements, the spacer element including a fluxing glass and having a selected proportion of ferrite particles in solution, there being a microstructural transition layer of a ferrite solid solution at the junction region between each of the pole elements and the spacer element.

4. A magnetic head assembly including a pair of ferrite pole elements and a vitreous spacer element firmly united to each of the pole elements, the vitreous spacer element including approximately 35% of a soda-lime fluxing glass, approximately 40% of a lead type wetting glass, and approximately 25% of a pulverized ferrite material corresponding to the material of the ferrite pole elements, the pulverized ferrite material being sufficiently fine to pass a 325 mesh, the melting temperature of the fluxing glass and wetting glass being below that of the ferrite material, and there being microstructural transition layers consisting of ferrite solid solutions at each junction surface between the spacer element and a ferrite pole element.

5. A magnetic transducer including a ferrite core defining pole tips separated by a selected gap, and a vitreous gap element coupling the pole tips and having in excess of 10% of pulverized ferrite in solution.

References Cited by the Examiner

UNITED STATES PATENTS

| | | | |
|---|---|---|---|
| 2,674,031 | 4/54 | Buhrendorf | 29—155.57 |
| 2,674,659 | 4/54 | Buhrendorf | 179—100.2 |
| 2,676,392 | 4/54 | Buhrendorf | 29—155.58 |
| 2,677,019 | 4/54 | Buhrendorf | 179—100.2 |
| 2,771,969 | 11/56 | Brownlow | 161—193 |
| 2,945,919 | 7/60 | Neumann | 179—100.2 |
| 3,024,318 | 3/62 | Duinker et al. | 179—100.2 |

FOREIGN PATENTS

| | | |
|---|---|---|
| 852,533 | 10/60 | Great Britain. |

IRVING L. SRAGOW, *Primary Examiner.*

DAVID G. REDINBAUGH, BERNARD KONICK, *Examiners.*